June 28, 1938.  A. E. BANKS  2,122,308
INDEPENDENT FOUR-WHEEL SPRING MOUNTING
Filed April 22, 1937  3 Sheets-Sheet 3
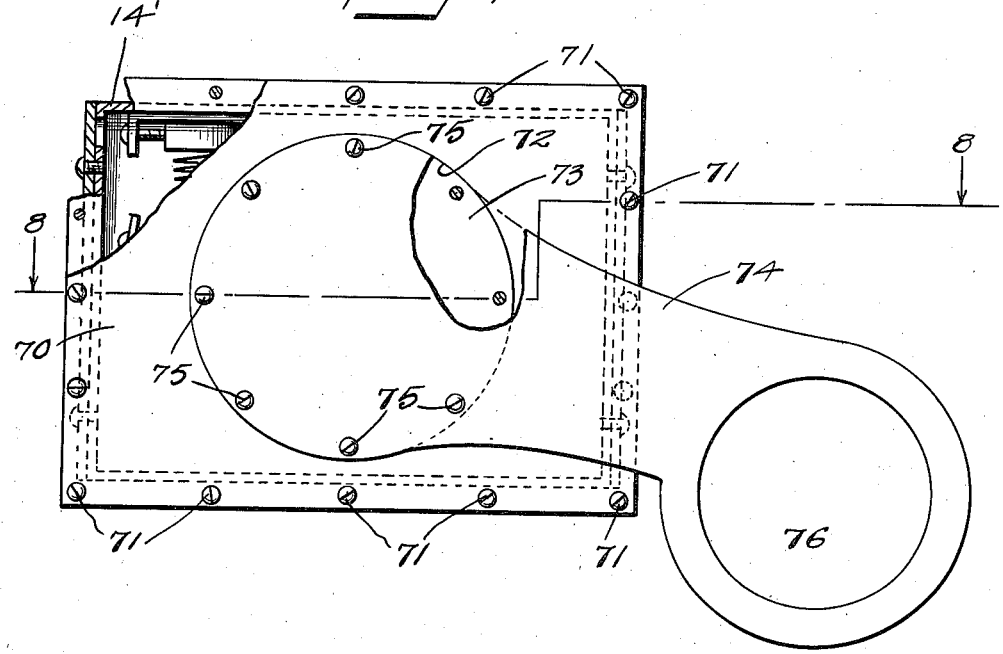
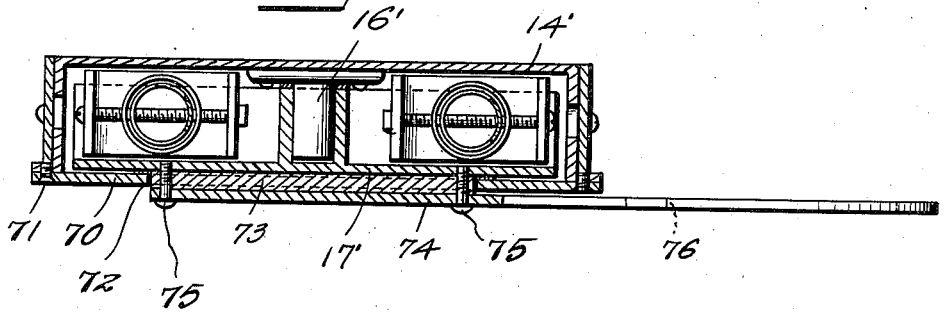
Inventor
A. E. Banks Patented June 28, 1938

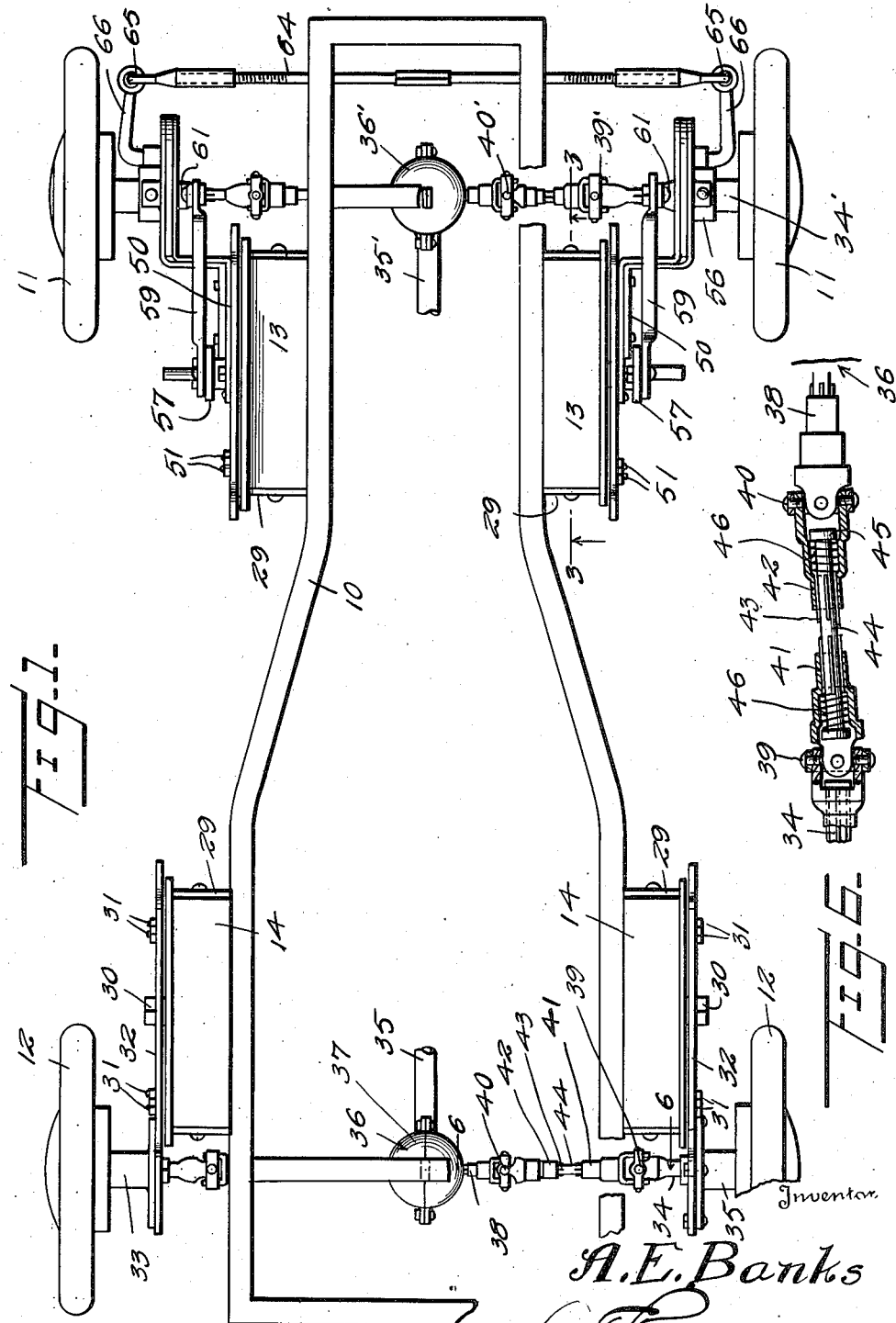

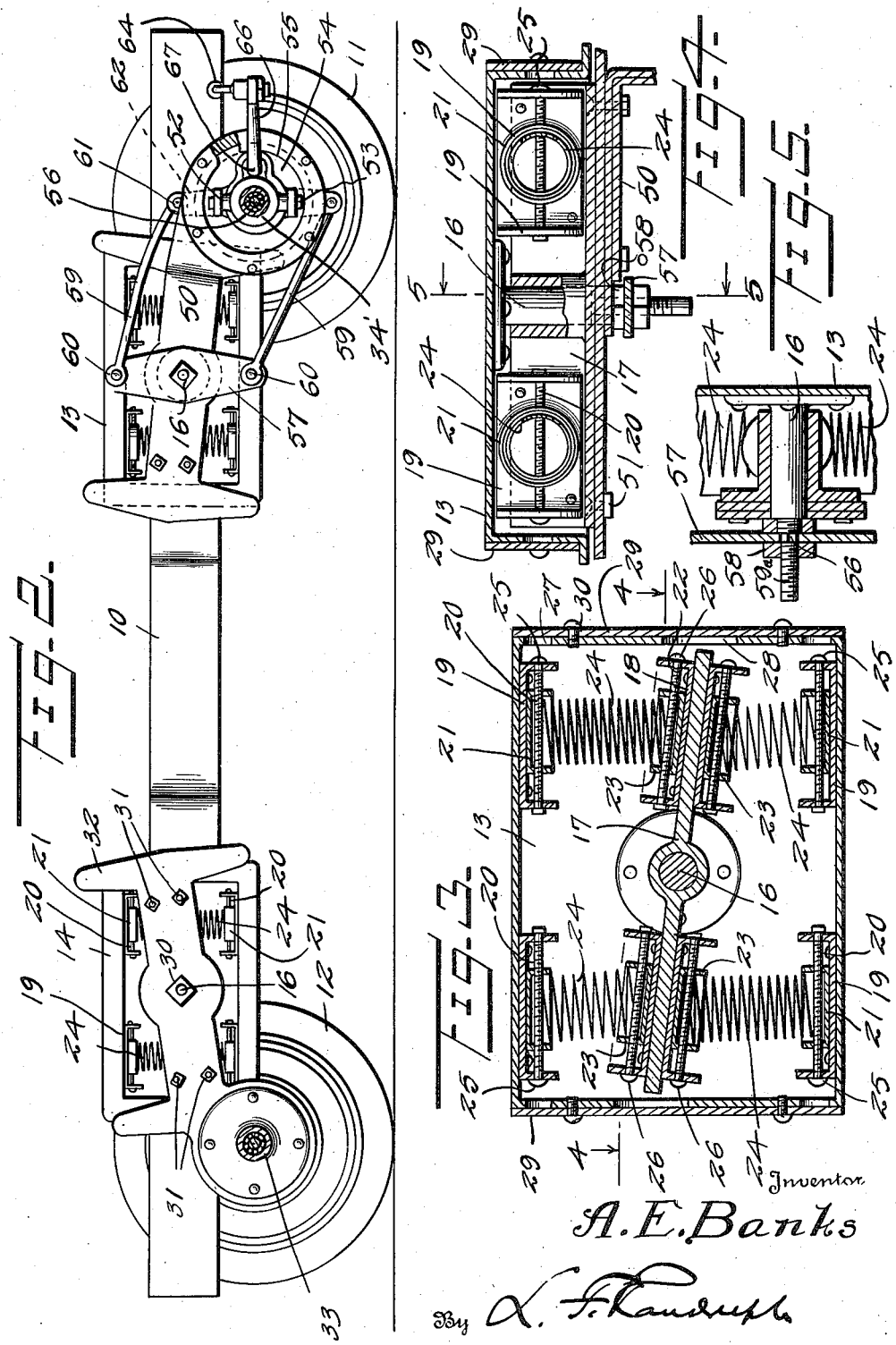

2,122,308

UNITED STATES PATENT OFFICE 2,122,308

INDEPENDENT FOUR-WHEEL SPRING MOUNTING

Arnold E. Banks, Cheboygan, Mich.

Application April 22, 1937, Serial No. 138,460

2 Claims. (Cl. 267—20)

This invention relates to means for mounting the four wheels of an automobile or equivalent vehicle and it aims to provide a novel construction wherein each wheel and its support will be mounted by an independent spring.

It is further aimed to provide novel spring structures and also to provide mountings for the wheels having differentially driven shafts, each provided with telescopic parts and with universal joints.

The more specific objects and advantages will become apparent from a consideration of the description following taken in connection with accompanying drawings illustrating an operative embodiment.

In said drawings:—

Figure 1 is a plan view of the chassis of an automobile equipped with my improvement;

Figure 2 is a side elevation of the parts of Figure 1;

Figure 3 is a detail section taken on the line 3—3 of Figure 1;

Figure 4 is a horizontal section taken on the line 4—4 of Figure 3;

Figure 5 is a detail section taken on the line 5—5 of Figure 4;

Figure 6 is a detail section taken on the line 6—6 of Figure 1;

Figure 7 is a side elevation, partly broken away, of a modified form of spring and lever mount, and Figure 8 is a detail section taken on the line 8—8 of Figure 7.

Referring specifically to the drawings, 10 designates a conventional automobile chassis associated with which are two front or steering wheels 11 and two rear wheels 12.

Said wheels are associated with individual spring devices generally designated 13. Each of the four spring devices 13 is preferably of the same construction. It consists of a suitable casing 14 which is bolted, riveted or otherwise fastened to the chassis 10. Rigidly fastened to each casing 14 centrally and interiorly thereof is a stud or pivot member 16. Pivotally mounted or journaled on the stud 16 is a lever 17. U-shaped spring retainers or brackets 18 are fastened to both sides of levers 17 on both sides of its axis, and similar retainers or brackets 19 are fastened to the upper and lower walls of the casing 14. Screws 20 are adjustably screw-threaded in the retainers or brackets 19 and also adjustably screw-threaded in cups 21. Similarly screws 22 are screw-threaded in the brackets 18 and in cups 23. The cups 21 and 23 are slidable through the adjustment of the screws 20 and 22, and such cups form seats for the opposite ends of main and cushion springs 24, which hold the lever 17 normally in the position shown in the drawings. The screws 20 and 22 have heads at 25 and 26, respectively, which are accessible for adjustment through openings 27 and 28 in end walls of the casing 14, normally closed by plate 29 secured to such walls by screws 30.

Journaled on the studs 16 for the rear wheels 12, and also removably attached rigidly to the lever 17 thereof, respectively, by means of a nut 30 and bolts 31 are levers 32 to which are rigidly fastened bearings 33 in which axle sections 34 are journaled in any suitable manner and on which the rear wheels 12 are demountably carried.

Said rear axle sections 34 are adapted to be positively driven as from a propeller shaft 35, operated by the motor of the automobile or vehicle, and through the usual differential gearing mechanism 36, whose casing 37 is fixed to the chassis 10 in any suitable manner. Said differential 36 positively drives differential shaft sections 38 on opposite sides thereof. At the free ends of the shaft sections 34 and 38, conventional universal joints 39 and 40, respectively, are provided and tubular portions 41 and 42 thereof are slidably and non-rotatably engaged as through the medium of grooves and splines at 43, with short shaft sections 44, the latter having heads 45 within the parts 41 and 42 and being engaged by expansive spring 46. As a result, as the wheels 12 move with the levers 32, cushioned by the springs 24, movement is accommodated through the universal joints at 39 and 40, augmented by the extensible shaft composed of the sections 41, 42 and 44. Each wheel 12 may thus operate independently in connection with its particular spring mounting.

In the case of the front wheels 11, they have levers 50 which are journaled on the adjacent studs 16 and which are fastened detachably and rigidly to the adjacent lever 17 as by means of bolts 51. Pivoted to the forward portions of levers 50 at outwardly extending ears 52 thereof, as by means of removable pins 53 are spindles 54, adapted to move on the vertical axes afforded by the pins 53. Said spindles 54 extend through openings 55 in the levers 50 and they are hollow or have bearings 56, in which shaft sections 34' similar to those at 34 are journaled.

The shaft sections 34' are adapted to be driven by a mechanism similar to that described with respect to the driving of the rear wheels and which includes a differential at 36', whose casing is supported on the chassis 10 and which differential is driven by a propeller shaft 35'.

Attention is called to the fact that both propeller shafts 35 and 35' may be driven by the same engine on the chassis or if preferred, the engine is adapted to drive the front wheels or the rear wheels, leaving the remaining pair free for steering as in existing automobiles.

The universal joints for the drive mechanism for the front wheels 11 are shown at 39' and 40', it being unnecessary to further specifically describe the same as it corresponds to that for the rear wheels as stated.

Rigidly fastened on square portions 56 of the studs 16 for the front wheels, are arms 57, a nut 58 being provided on a reduced portion 59a of the studs 16 outwardly thereof. Parallel equalizing links or bars 59 are pivoted at 60 to the upper and lower ends of the bars 57 and are pivoted at 61 to brackets 62 carried by a forward portion of the levers 50, above and below the axis of rotation of the front wheels.

The mounting of the spindles as previously traced, permits the front wheels to be steered as desired although independently supported and cushioned by the spring devices. For instance, a connecting rod 64 is provided and adapted to be actuated in a conventional manner from a steering mechanism, which rod is preferably adjustable and at its ends has ball and socket connections at 65 with arms 66 journaled on horizontal axes at 67 in the spindles 54. The pivotal mountings at 67 compensate for movement of the parts which may occur relatively to the steering gear.

It will be realized that as a result of the construction described, each wheel is effectively, independently and resiliently mounted so that each may yield relatively to the other and are cushioned by the associated springs 24 and that the springs 24 may be adjusted as to position and tension as desired from time to time through the operation of the screws 20 and 22.

Various changes may be resorted to within the spirit and scope of the invention. For instance, a modified form of the wheel mounting lever means may be used as suggested in Figures 7 and 8. This form has a casing 14' corresponding to that at 14 with a lever 17' therein journaled on a stud 16' therein, and otherwise mounted and resiliently supported identically with the spring device previously described. The casing 14' in this instance, has a cover plate 70 removably fastened thereto as by means of screws 71. Cover plate 70 has a large central opening 72 in which a disc 73 is disposed. Outwardly of the disc 73 is a lever 74 and screws 75 pass through the lever, disc and into the lever 17'. Said lever 74 functions like the levers 32 and 50 and may be substituted for either of them, the lever 74, preferably having an opening 76 through the same adjacent its free end to accommodate the mounting of the bearings or spindles for the wheels.

I claim as my invention:—

1. A device of the class described, comprising a lever, cushioning springs for the lever, a casing mounting the cushioning springs and having a stud on which the lever is pivoted, a spindle pivotally mounted on the lever, a wheel having a shaft journaled in the spindle, and arms fixed to the stud, equalizing arms pivoted to the first mentioned arms, and said equalizing arms being pivoted to the spindle on opposite sides of its axis.

2. A spring device of the class described comprising a casing, a stud in said casing, a lever journaled on the stud, brackets on the casing and lever, screws mounted by the brackets, cups adjustably connected to the screws, and cushioning spring members mounted by the cups.

ARNOLD E. BANKS.